(12) United States Patent
Kim

(10) Patent No.: US 12,441,908 B2
(45) Date of Patent: Oct. 14, 2025

(54) MULTILAYER PAINT PROTECTION FILM FOR VEHICLE

(71) Applicant: AMTE CO.,LTD, Chungcheongnam-do (KR)

(72) Inventor: Nam Hoon Kim, Ansan-si (KR)

(73) Assignee: AMTE CO., LTD, Yesan-Gun (KR)

( * ) Notice: Subject to any disclaimer, the term of this patent is extended or adjusted under 35 U.S.C. 154(b) by 406 days.

(21) Appl. No.: 18/135,929

(22) Filed: Apr. 18, 2023

(65) Prior Publication Data

US 2023/0340294 A1    Oct. 26, 2023

(30) Foreign Application Priority Data

Apr. 22, 2022    (KR) .................. 10-2022-0050120

(51) Int. Cl.
| | | |
|---|---|---|
| C09J 7/20 | (2018.01) | |
| C09D 7/20 | (2018.01) | |
| C09D 7/48 | (2018.01) | |
| C09D 175/06 | (2006.01) | |
| C09J 7/25 | (2018.01) | |

(52) U.S. Cl.
CPC ............. *C09D 175/06* (2013.01); *C09D 7/20* (2018.01); *C09D 7/48* (2018.01); *C09J 7/25* (2018.01); *C09J 2301/302* (2020.08); *C09J 2475/001* (2013.01); *Y10T 428/2848* (2015.01); *Y10T 428/2891* (2015.01); *Y10T 428/31554* (2015.04)

(58) Field of Classification Search
None
See application file for complete search history.

(56) References Cited

U.S. PATENT DOCUMENTS

| | | | |
|---|---|---|---|
| 10,711,156 B2* | 7/2020 | Ho | .......................... C08G 18/44 |
| 2008/0199704 A1* | 8/2008 | Ho | .......................... B32B 27/36 |
| | | | 156/60 |
| 2010/0032082 A1* | 2/2010 | Ho | ............................. C09J 7/29 |
| | | | 156/222 |

FOREIGN PATENT DOCUMENTS

KR    10-2021-0013844 A    2/2021

* cited by examiner

*Primary Examiner* — Anish P Desai
(74) *Attorney, Agent, or Firm* — Sughrue Mion, PLLC

(57) ABSTRACT

Proposed is a paint protection film with excellent self-healing ability, stain resistance, and weather resistance. When being applied to vehicles, damage to the painted surface, such as chipping, scratches, and the like occurring in the middle of driving, can be effectively prevented. In addition, even when exposed to the external environment for a long period of time, the transparency of the film can be maintained. Furthermore, discoloration or stains caused by contaminants can be prevented, thereby maintaining aesthetics.

9 Claims, No Drawings

MULTILAYER PAINT PROTECTION FILM FOR VEHICLE

CROSS REFERENCE TO RELATED APPLICATION

The present application claims priority to Korean Patent Application No. 10-2022-0050120, filed Apr. 22, 2022, the entire contents of which is incorporated herein for all purposes by this reference.

BACKGROUND OF THE DISCLOSURE

1. Field of the Disclosure

The present disclosure relates to a multilayer film for protecting a painted surface, the transparent protection film having excellent stain resistance and durability while having no discoloration even after a long period of time.

2. Description of the Related Art

Painting is a typical method used for protecting objects from the external environment and increasing durability thereof. Recently, aesthetic functions of painting itself, in addition to basic functions, have also emerged as important factors. In the case of vehicles, the gloss and color of paint applied to a vehicle body are particularly emphasized and act as critical factors in consumer choice.

However, vehicles are always exposed to the external environment, and paint damage such as chipping or scratches thus can easily occur during road driving. For this reason, a paint protection film for a vehicle is conventionally applied on the painted surface to prevent such damage. Therefore, the protection film is basically required to be transparent and not be easily discolored and is also required to have advantages such as durability, stain resistance performance, and the like.

Polyurethane-based films, widely used for protecting the paintwork of ships, military helicopters, and the like, have been used for protection films for vehicles. However, there is a limitation in the function of the protection film having only a single polyurethane film layer. In addition, unlike the paint protection films for ships, military helicopters, and the like, in which durability or stain resistance is the most critical, the protection films for vehicles are required to have more diverse functions because aesthetic qualities are also required to be considered. To solve such problems, various attempts, such as developing a film in which a different type of resin is added to a polyurethane resin as disclosed in Korean Patent Application Publication No. 10-2021-0013844, adding a functional material, or the like, have been made.

DOCUMENT OF RELATED ART

Patent Document (Patent Document 1) Korean Patent Application Publication No. 10-2021-0013844,

SUMMARY OF THE INVENTION

An objective of the present disclosure is to provide a transparent paint protection film having excellent stain resistance and durability, as well as having no yellowing even after a long period of time.

The present disclosure provides a paint protection film including: a coating layer including polycaprolactone-based polyurethane; a base layer including polyester-based thermoplastic polyurethane; and an adhesive layer.

The paint protection film of the present disclosure includes: the coating layer including the polycaprolactone-based polyurethane formed by mixing first and second compositions; the base layer including the polyester-based thermoplastic polyurethane; and the adhesive layer. The first composition has a viscosity in a range of 1 cPs to 10 cPs at a temperature of 25° C. and includes: 75 parts to 185 parts by weight of an ester-based solvent, 10 parts to 80 parts by weight of a ketone-based solvent, and 60 parts to 160 parts by weight of a glycol ester-based solvent, with respect to 100 parts by weight of polycaprolactone triol. In addition, the second composition has a viscosity in a range of 40 cPs to 50 cPs at a temperature of 25° C. and includes: 10 parts to 35 parts by weight of an aromatic hydrocarbon-based solvent and 10 parts to 35 parts by weight of an ester-based solvent, with respect to 100 parts by weight of hexamethylene diisocyanate.

In the present disclosure, a weight ratio of the first composition to the second composition of the paint protection film may be in a range of 2.5:1 to 3.5:1.

In the present disclosure, the coating layer of the paint protection film may have an elongation at break of 160% or higher at a temperature of 25° C., a haze of 2% or lower, and a transmittance of 90% or higher.

In the present disclosure, the ester-based solvent of the paint protection film may include at least one selected from the group consisting of ethyl acetate, n-butyl acetate, isobutyl acetate, and amyl acetate.

In the present disclosure, the ketone-based solvent of the paint protection film may include at least one selected from the group consisting of acetone, acetylacetone, methyl ethyl ketone, methyl isobutyl ketone, diisobutyl ketone, and cyclohexanone.

In the present disclosure, the glycol ester-based solvent of the paint protection film may include at least one selected from the group consisting of ethylene glycol methyl ether acetate, diethylene glycol monobutyl ether acetate, ethylene glycol monobutyl ether acetate, propylene glycol monoethyl ether acetate, and propylene glycol methyl ether acetate.

In the present disclosure, the aromatic hydrocarbon-based solvent of the paint protection film may include at least one selected from the group consisting of xylene, toluene, and benzene.

In the present disclosure, the first composition of the paint protection film may include a silicone oil in an amount in a range of 3 parts to 20 parts by weight.

In the present disclosure, the base layer of the paint protection film may include an ultraviolet (UV) stabilizer.

In the present disclosure, the adhesive layer of the paint protection film may include a polyacrylate pressure-sensitive adhesive.

A paint protection film of the present disclosure is a composite paint protection film in which different types of polyurethane-based film layers are laminated. The paint protection film exhibits excellent self-healing ability, maintains excellent stain resistance even when exposed to harsh external environments for a long period of time, and has no yellowing.

When forming a coating layer including polycaprolactone-based polyurethane, each composition of a solvent and a monomer used for the formation of the polyurethane is specified in the paint protection film of the present disclosure. Thus, a coating layer with excellent elasticity, adhesion, and applicability can be formed without other additives.

The present disclosure can provide the transparent paint protection film with good durability by laminating the layer including polycaprolactone-based polyurethane and a layer including polyester-based polyurethane.

DESCRIPTION OF THE PREFERRED EMBODIMENTS

Hereinafter, the advantages and features of the present disclosure, and methods for achieving them will be apparent with reference to the embodiments described below in detail in conjunction with the accompanying drawings. However, the disclosure is not limited to the embodiments set forth below and may be implemented in many different forms. The following embodiments are provided only to completely disclose the disclosure and inform those skilled in the art of the scope of the disclosure. In addition, the disclosure is defined only by the scope of the appended claims. Like reference numerals are used to identify like elements throughout the specification. In the following description, it is to be noted that, when the functions of conventional elements and the detailed description of elements related to the present disclosure may make the gist of the disclosure unclear, a detailed description of those elements will be omitted. In addition, technical terms, as will be mentioned hereinafter, are terms defined in consideration of their function in the present disclosure, which may be varied according to the intention of a user, practice, or the like, so that the terms should be defined based on the contents of this specification.

The present disclosure relates to a paint protection film and preferably to a paint protection film for vehicles.

In the present disclosure, a coating layer of the paint protection film, which includes polycaprolactone-based polyurethane, may be positioned on a first surface of a base layer including polyester-based thermoplastic polyurethane. In addition, an adhesive layer may be positioned on a second surface of the base layer.

In the present disclosure, the base layer of the paint protection film includes the polyester-based thermoplastic polyurethane, which can be formed by the polymerization of polyester polyol and diisocyanate. Preferably, a polyester-based thermoplastic polyurethane film based on polyester polyol having a hydroxyl value in a range of 10 KOH/g to 200 KOH/g and a number average molecular weight in a range of 100 g/mol to 3000 g/mol is used. According to one embodiment of the present disclosure, a thickness of the base layer may be in a range of 100 μm to 300 μm, and is preferably in the range of 150 μm to 250 μm. However, the thickness of the base layer is not limited thereto, and may be adjusted in consideration of a thickness of the coating layer, a thickness of the adhesive layer, and a total thickness of the paint protection film. According to another embodiment of the present disclosure, the polyester-based thermoplastic polyurethane film may have a transmittance in a range of 85% to 95%. The transmittance is preferably in the range of 90% to 95% and more preferably, 90% or higher. In addition, the polyester-based thermoplastic polyurethane film may have a haze in a range of 0.1% to 3%. The haze is preferably in the range of 0.1% to 2.5% and more preferably, 2% or lower.

In the present disclosure, the coating layer of the paint protection film includes the polycaprolactone-based polyurethane and may include polyurethane formed by the polymerization of polycaprolactone polyol and diisocyanate. The polycaprolactone polyol may be polycaprolactone triol having a number average molecular weight (Mn) in a range of 100 g/mol to 2000 g/mol, preferably in the range of 200 g/mol to 1300 g/mol. According to one embodiment of the present disclosure, the polycaprolactone triol $C_2H_5C[CH_2O[CO(CH_2)_5O]_nH]_3$ (having an Mn in a range of 100 to 2000) may be mixed with an ester-based solvent, a ketone-based solvent, and a glycol ester-based solvent to be used for the preparation of compositions to prepare a coating solution.

In the present disclosure, the diisocyanate used in the polyurethane polymerization in the paint protection film may include at least one selected from the group consisting of poly(1,6-hexamethylene diisocyanate) (HDI), 2,4,4-trimethyl hexamethylene diisocyanate, isophorone diisocyanate, and is preferably hexamethylene diisocyanate isocyanurate trimer, which is HDI trimer.

In the present disclosure, the coating layer of the paint protection film includes the polycaprolactone-based polyurethane formed by mixing first and second compositions. The coating layer may be formed by a method of applying a coating solution in which the first and second compositions are mixed on the base layer. In the solution for forming the coating layer, the first composition has a viscosity in a range of 1 cPs to 10 cPs at a temperature of 25° C., and includes: 75 parts to 185 parts by weight of an ester-based solvent, 10 parts to 80 parts by weight of a ketone-based solvent, and 60 parts to 160 parts by weight of a glycol ester-based solvent, with respect to 100 parts by weight of the polycaprolactone triol. In addition, the second composition has a viscosity in a range of 40 cPs to 50 cPs at a temperature of 25° C., and includes: 10 parts to 35 parts by weight of an aromatic hydrocarbon-based solvent and 10 parts to 35 parts by weight of an ester-based solvent, with respect to 100 parts by weight of hexamethylene diisocyanate.

In the present disclosure, the method of applying the solution, used for the formation of the coating layer, is simple and costly effective, as well as advantageous in that a desired thickness of the coating layer can be uniformly formed. According to one embodiment of the present disclosure, the coating solution may be prepared by mixing two different types of compositions, each of which includes a polyurethane polymerization monomer and an organic solvent. With predetermined types and amounts of organic solvent, the transparent paint protection film having excellent self-healing ability and stain resistance performance, as well as having no yellowing even after a long period of time, can be manufactured through a simple solution casting process. The coating layer may have a thickness in a range of 5 μm to 35 μm. The thickness of the coating layer is preferably in a range of 5 μm to 30 μm, more preferably in the range of 10 μm to 25 μm, and even more preferably in the range of 10 μm to 20 μm. According to one embodiment of the present disclosure, when the thickness of the coating layer is small, durability may be deteriorated. On the contrary, when the thickness of the coating layer is large, a deterioration in light transmittance may be exhibited.

In the present disclosure, the first composition used for the formation of the coating layer has a viscosity in a range of 1 cPs to 10 cPs at a temperature of 25° C. and includes: 75 parts to 185 parts by weight of the ester-based solvent, 10 parts to 80 parts by weight of the ketone-based solvent, and 60 parts to 160 parts by weight of the glycol ester-based solvent, with respect to 100 parts by weight of the polycaprolactone triol. The first composition may have a nonvolatile phase in an amount in a range of 20% to 30% by weight, preferably in an amount in the range of 22% to 27% by weight. In the first composition, the polycaprolactone triol and the three different types of organic solvents are mixed. Each content of the polyol and organic solvents may be adjusted to maintain the stability of the first composition. The polyol and organic solvents, included in the first composition, are controlled so that the transparent polyurethane coating layer with good durability and stain resistance can be formed, even without a diol chain extender having a low molecular weight, such as butanediol, pentanediol, hexanediol, and the like, typically used in polyurethane polymerization. According to one embodiment of the present disclosure, when at least one of the ester-based solvent, the ketone-based solvent, and the glycol ester-based solvent is included in the first composition in a low or high amount, the properties of the coating layer, such as transparency, durability, workability, or stain resistance performance, may be deteriorated, and yellowing may occur.

To improve water repellent effect of the coating layer, the first composition may include a silicone oil in an amount in a range of 3 parts to 20 parts by weight, preferably in an amount in the range of 5 parts to 15 parts by weight, with respect to 100 parts by weight of the polycaprolactone triol. According to one embodiment of the present disclosure, the silicone oil may be a modified silicone oil or non-reactive silicone oil. In the case where the silicone oil is the modified silicone oil, the modified silicone oil may be a modified silicone oil, into which one to two carbinol groups are introduced, having a specific gravity in a range of 0.96 to 0.98 and a refractive index in a range of 1.405 to 1.410, at a temperature of 25° C.

In the present disclosure, the second composition used for the formation of the coating layer has a viscosity in a range of 40 cPs to 50 cPs at a temperature of 25° C. and includes: 10 parts to 35 parts by weight of the aromatic hydrocarbon-based solvent and 10 parts to 35 parts by weight of the ester-based solvent, with respect to 100 parts by weight of hexamethylene diisocyanate. The second composition may have a non-volatile phase in an amount in a range of 60% to 80% by weight, preferably in an amount in the range of 65% to 75% by weight. In the second composition, the hexamethylene diisocyanate and the two different types of organic solvents are mixed. Each content of the polyol and organic solvents may be adjusted to maintain the stability of the second composition and promote inducement of the polyurethane polymerization reactions. The hexamethylene diisocyanate and organic solvents, included in the second composition, are controlled so that the transparent polyurethane coating layer with good durability and stain resistance can be formed, even without other functional additives or reaction accelerators. According to one embodiment of the present disclosure, when at least one of the hydrocarbon-based solvent and the glycol ester-based solvent is included in the second composition in a low or high amount, yellowing may easily occur in the coating layer, and stain resistance may be deteriorated.

The coating layer of the present disclosure may be formed by using the coating solution in which the first and second compositions are evenly mixed after preparing each of the first and second compositions. The viscosity of the second composition, mixed in a smaller amount, is higher than that of the first composition. When mixing the compositions, the first composition having a viscosity in the range of 1 cPs to 10 cPs and the second composition having a viscosity in the range of 40 cPs to 50 cPs, the compositions may be evenly mixed. The coating solution may be prepared by mixing the first and second compositions in a weight ratio in a range of 2.5:1 to 3.5:1. Since the weight ratio of the first composition to the second composition being mixed is related to the promotion of polyurethane polymerization, the stability of the solution during the reactions, and the deterioration of the reaction due to the residual solvent, various properties of the coating layer, such as durability, self-healing ability, stain resistance, transparency, and yellowing, may be affected. The coating layer may have an elongation at break of 160% or higher at a temperature of 25° C., preferably in the range of 160% to 250%, a haze of 2% or lower, and a total light transmittance of 90% or higher. In addition, the coating layer has no yellowing even after a long period of time due to excellent weather resistance, and has excellent resistance to coloring or stains caused by contaminants, such as oil and the like. According to one embodiment of the present disclosure, when the elongation at break is low, film application may be difficult. On the contrary, when the elongation at break is high, elasticity may be decreased, or wrinkles in the film may be formed after the application. According to another embodiment of the present disclosure, when the first composition is mixed in a small amount, an opaque coating layer may be formed. Alternatively, self-healing ability may be insufficient, or stain resistance may be deteriorated. According to a further embodiment of the present disclosure, when the first composition is mixed in a large amount, an opaque coating layer may be formed. In addition, film application may be deteriorated due to a decrease in elongation, and yellowing may easily occur.

In the present disclosure, the ketone-base solvent in the first composition may include at least one selected from the group consisting of acetone, acetylacetone, methyl ethyl ketone, methyl isobutyl ketone, diisobutyl ketone, and cyclohexanone. The ketone-based solvent is preferably acetylacetone.

In the present disclosure, the glycol ester-based solvent in the first composition may include at least one selected from the group consisting of ethylene glycol methyl ether acetate, diethylene glycol monobutyl ether acetate, ethylene glycol monobutyl ether acetate, propylene glycol monoethyl ether acetate, and propylene glycol methyl ether acetate. The glycol ester-based solvent is preferably propylene glycol methyl ether acetate.

In the present disclosure, the aromatic hydrocarbon-based solvent in the second composition may include at least one selected from the group consisting of xylene, toluene, and benzene. The aromatic hydrocarbon-based solvent is preferably toluene.

In the present disclosure, the ester-based solvent in the first and second compositions may include at least one selected from the group consisting of ethyl acetate, n-butyl acetate, isobutyl acetate, and amyl acetate. The ester-based solvent is preferably n-butyl acetate.

The coating layer of the present disclosure may be formed by a solution coating method, and known methods, such as solution casting, may be used. According to one embodiment of the present disclosure, the transparent coating layer may be formed by applying the coating solution on a process belt, drum, or base used for the formation of the coating layer and then performing drying and aging. The dry coating may be performed by being heated to a temperature in a range of 50° C. to 150° C., preferably in the range of 50° C. to 125° C., for 1 minute to 5 minutes before the aging. When directly applied on the base, the coating is preferably performed at temperatures that do not cause the denaturation of the base layer. The aging is preferably performed at a temperature in a range of 30° C. to 70° C. for 24 hours to 72 hours.

In the present disclosure, the adhesive layer of the paint protection film may be formed on the first surface of the base layer including the polyester-based thermoplastic polyurethane so that the base layer is positioned between the coating layer and the adhesive layer. The adhesive layer is not limited unless the adhesive layer is a pressure-sensitive adhesive (PSA) layer. At least one selected from the group consisting of a synthetic rubber adhesive, a silicone-based adhesive, and a polyacrylate-based adhesive may be used. In addition, a polyacrylate pressure-sensitive adhesive formed by polymerization of alkyl acrylate having 1 to 6 carbon atoms and acrylic acid or methacrylic acid is preferably used.

According to one embodiment of the present disclosure, the adhesive layer may have a thickness in a range of 10 μm to 60 μm, preferably in the range of 20 μm to 50 μm, and more preferably in the range of 30 μm to 40 μm.

The paint protection film of the present disclosure may be manufactured by forming the coating layer including the polycaprolactone-based polyurethane on the first surface of the base layer including the polyester-based thermoplastic polyurethane, and forming the adhesive layer on the second surface of the base layer. The adhesive layer may be prepared by coating a release film and the like, but is not limited thereto.

More specifically, the paint protection film may be formed by the following processes: evenly mixing the first and second compositions in a weight ratio in a range of 2.5:1 to 3.5:1 to prepare the coating solution; applying the coating solution on the first surface of the base layer; inducing the polyurethane polymerization reactions and performing aging to form the coating layer; and applying or laminating the adhesive layer on the second surface of the base layer. The dry coating may be selectively performed for 1 minute to 5 minutes by being heated to a temperature in a range of 50° C. to 125° C., before the aging. The dry coating may be performed at temperatures that do not cause the denaturation of the base layer and film shrinkage, after manufacturing the paint protection film. The aging is preferably performed at a temperature in a range of 30° C. to 70° C. for 24 hours to 72 hours. According to one embodiment of the present disclosure, the coating layer is formed by casting the coating solution prepared with the first and second compositions, so the thickness of the coating layer can be precisely controlled. In addition, complicated processes are unnecessary, so a costly effective coating layer with excellent physical properties can be formed.

In the present disclosure, in the case where the paint protection film includes a functional additive, such as an ultraviolet (UV) stabilizer, a light stabilizer, and the like, to improve the resistance to discoloration and the like, the corresponding additive is preferably included in the base layer or the first composition.

The paint protection film of the present disclosure is manufactured by laminating the polyurethane-based film layers, thereby having an excellent paint protection effect. In addition, even when exposed to the external environment for a long period of time, the transparency of the paint protection film can be maintained. The paint protection film can be manufactured by a costly effective method and can have excellent properties without involving additives used to enhance the performance of existing films. According to one embodiment of the present disclosure, the paint protection film may be a multilayer paint protection film in which the coating layer, the base layer, the adhesive layer, and the release film are sequentially laminated. Even when additional functional layers are not included, good paint protection film can be provided. According to another embodiment of the present disclosure, the first composition used for the formation of the coating layer may be composed of only four compositions, polycaprolactone triol, the ester-based solvent, the ketone-based solvent, and the glycol ester-based solvent. In addition, the second composition may be composed of only three compositions, hexamethylene diisocyanate, the aromatic hydrocarbon-based solvent, and the ester-based solvent. As a result, even when other functional materials are not additionally used, a coating layer with excellent self-healing ability, stain resistance, and weather resistance can be formed.

The paint protection film of the present disclosure can be used for the protection of various types of painted (coated) surfaces formed in objects, and is preferably used as the paint protection film for vehicles. In addition, the paint protection film can be used to protect the bumper surface and headlight surface.

Hereinafter, the present disclosure will be described in more detail with reference to specific examples for carrying out the present disclosure. The examples are only references for explaining the present disclosure in detail, and the present disclosure is not limited thereto.

Unless otherwise defined, the examples may be interpreted according to meaning, standard, numerical value, analysis, or measurement method (JIS, ISO, ASTM, etc.) as commonly understood by those skilled in the art to which the disclosure belongs.

Example 1

1000 g of polycaprolactone triol (having CAS No. 37625-56-2 and a number average molecular weight (Mn) of 850), 1300 g of n-butyl acetate, 450 g of acetylacetone, and 1100 g of propylene glycol methyl ether acetate (PGMEA) were mixed to prepare 3850 g of a first composition. The first composition had a non-volatile phase in an amount of 26% by weight and a viscosity of 6 cPs at a temperature of 25° C. 1000 g of hexamethylene diisocyanate isocyanurate trimer (having CAS No. 3779-63-3), 250 g of toluene, and 250 g of n-butyl acetate were mixed to prepare 1500 g of a second composition. The second composition had a non-volatile phase in an amount of 67% by weight and a viscosity of 43 cPs at a temperature of 25° C. Then, 300 g of the first composition and 100 g of the second composition being prepared were mixed. Next, the mixture was dry-coated at a temperature of 120° C. for 3 minutes and then aged at a temperature of 50° C. for 48 hours to manufacture a coating layer film having a thickness of 15 μm.

Specimens were prepared with the manufactured coating layer film to examine the properties of the coating layer film with the following methods. The viscosity of the composition was measure with a digital viscometer (Brookfield DV-II+). The non-volatile phase of the composition was calculated according to the following equation: non-volatile phase (%)=(weight of composition after drying/weight of composition before drying)*100, after 3 g of the composition was put on a sample dish and dried at a temperature of 105° C. for 2 hours to calculate. The transmittance and haze of the film were measured according to JIS K7105, and the elongation at break (%) at a temperature of 25° C. was measured according to ASTM D882. The self-healing ability of the film was measured by scratching a copper brush 10 times for 1 minute based on a loading of 500 g, checking the scratches with the naked eye, and then calculating the time to be restored to the original state. The weather resistance of the film was examined by placing a specimen marked with a test marker pen in a chamber equipped with a xenon lamp (maintained at a temperature of 45° C. and a humidity of 45%) for 500 hours, removing the marked area with acetone or a hydrocarbon solvent, and then observing the yellowing of the specimen with the naked eye. The temperature resistance and humidity resistance of the film were examined by placing the specimen marked with a marker pen in a thermo-hygrostat (maintained at a temperature of 85° C. and a humidity of 85%) for 25 days and observing whether the marked area was removed or not and the yellowing of the specimen with the naked eye.

Example 2

A coating layer film having a thickness of 15 µm was manufactured in the same manner as in Example 1, except that 250 g of the first composition and 100 g of the second composition prepared in Example 1 were mixed.

Example 3

A coating layer film having a thickness of 15 µm was manufactured in the same manner as in Example 1, except that 350 g of the first composition and 100 g of the second composition prepared in Example 1 were mixed.

Comparative Example 1

A coating layer film having a thickness of 15 µm was manufactured in the same manner as in Example 1, except that 150 g of the first composition and 100 g of the second composition prepared in Example 1 were mixed.

Comparative Example 2

A coating layer film having a thickness of 15 µm was manufactured in the same manner as in Example 1, except that 200 g of the first composition and 100 g of the second composition prepared in Example 1 were mixed.

Comparative Example 3

A coating layer film having a thickness of 15 µm was manufactured in the same manner as in Example 1, except that 400 g of the first composition and 100 g of the second composition prepared in Example 1 were mixed.

The examination results of the properties of the coating layer films manufactured in Examples 1 to 3 and Comparative Examples 1 to 3 are shown in [Table 1] and [Table 2] below.

TABLE 1

| | Transmittance (%) | Haze (%) | Elongation at break (%) | Self-healing ability (sec) |
|---|---|---|---|---|
| Example 1 | 93 | 1 | 201 | 52 |
| Example 2 | 91 | 2 | 185 | 58 |
| Example 3 | 92 | 2 | 186 | 57 |
| Comparative Example 1 | 86 | 4 | 151 | 74 |
| Comparative Example 2 | 82 | 5 | 145 | 78 |
| Comparative Example 3 | 85 | 5 | 137 | 69 |

TABLE 2

| | Weather resistance | | Temperature resistance and humidity resistance | |
|---|---|---|---|---|
| | Yellowing | Marker pen stain removal | Yellowing | Marker pen stain removal |
| Example 1 | x | o | x | o |
| Example 2 | x | o | x | o |
| Example 3 | x | o | x | o |
| Comparative Example 1 | x | x | o | Δ |
| Comparative Example 2 | x | o | x | o |
| Comparative Example 3 | o | Δ | o | x |

*Yellowing: x = no discoloration observed with the naked eye, o = discoloration observed with the naked eye
**Marker stains: o = no stains observed with the naked eye, Δ = stains observed in the marked area, x = stains not removed All of the coating layer films manufactured in Examples 1 to 3, in which a weight ratio of the first composition to the second composition being mixed was in a range of 2.5:1 to 3.5:1, exhibited excellent transmittance, haze, elongation at break, and self-healing ability. In addition, in Examples 1 to 3, yellowing was not observed, and all stains marked with the marker pen on the surface of the coating layer film were washed and removed, so discoloration resistance and stain resistance were excellent.

Comparative Examples 4 to 9

Each solvent composition in a first composition was prepared as shown in [Table 3] below. Next, the first and second compositions were mixed, dry coated at a temperature of 120° C. for 3 minutes, and then aged at a temperature of 50° C. for 48 hours to manufacture a coating layer film having a thickness of 15 µm.

TABLE 3

| | | Comparative Example 4 | Comparative Example 5 | Comparative Example 6 | Comparative Example 7 | Comparative Example 8 | Comparative Example 9 |
|---|---|---|---|---|---|---|---|
| First composition | Polycaprolactone triol | 100 g | 100 g | 100 g | 100 g | 100 g | 100 g |
| | n-butyl acetate | 65 g | 200 g | 60 g | 200 g | 130 g | 130 g |
| | Acetylacetone | 110 g | 5 g | 45 g | 45 g | 5 g | 110 g |
| | PGMEA | 110 g | 110 g | 180 g | 45 g | 180 g | 45 g |
| | Total | 385 g | 415 g | 385 g | 390 g | 415 g | 385 g |
| Second composition | HDI trimer | 100 g | 100 g | 100 g | 100 g | 100 g | 100 g |
| | Toluene | 25 g | 25 g | 25 g | 25 g | 25 g | 25 g |
| | n-butyl acetate | 25 g | 25 g | 25 g | 25 g | 25 g | 25 g |
| | Total | 150 g | 150 g | 150 g | 150 g | 150 g | 150 g |

Comparative Examples 10 and 11

Each solvent composition in a second composition was prepared as shown in [Table 4] below. Next, the first and second compositions were mixed, dry coated at a temperature of 120° C. for 3 minutes, and then aged at a temperature of 50° C. for 48 hours to manufacture a coating layer film having a thickness of 15 μm.

TABLE 4

|  |  | Comparative Example 10 | Comparative Example 11 |
|---|---|---|---|
| First composition | Polycaprolactone triol | 100 g | 100 g |
|  | n-butyl acetate | 130 g | 130 g |
|  | Acetylacetone | 45 g | 45 g |
|  | PGMEA | 110 g | 110 g |
|  | Total | 385 g | 385 g |
| Second composition | HDI trimer | 100 g | 100 g |
|  | Toluene | 5 g | 45 g |
|  | n-butyl acetate | 45 g | 5 g |
|  | Total | 150 g | 150 g |

The properties of the coating layer films manufactured in Comparative Examples 4 to 11 were examined in the same manner as in Example 1. The results thereof are shown in [Table 5] and [Table 6] below.

TABLE 5

|  | Transmittance (%) | Haze (%) | Elongation at break (%) | Self-healing ability (sec) |
|---|---|---|---|---|
| Comparative Example 4 | 89 | 3 | 174 | 65 |
| Comparative Example 5 | 84 | 4 | 154 | 74 |
| Comparative Example 6 | 89 | 3 | 169 | 58 |
| Comparative Example 7 | 90 | 2 | 181 | 69 |
| Comparative Example 8 | 85 | 4 | 158 | 71 |
| Comparative Example 9 | 88 | 3 | 175 | 64 |
| Comparative Example 10 | 92 | 2 | 178 | 58 |
| Comparative Example 11 | 91 | 2 | 179 | 61 |

TABLE 6

|  | Weather resistance | | Temperature resistance and humidity resistance | |
|---|---|---|---|---|
|  | Yellowing | Marker pen stain removal | Yellowing | Marker pen stain removal |
| Comparative Example 4 | ○ | ○ | ○ | x |
| Comparative Example 5 | x | ○ | x | ○ |
| Comparative Example 6 | ○ | x | ○ | x |
| Comparative Example 7 | ○ | x | ○ | x |
| Comparative Example 8 | x | ○ | x | ○ |
| Comparative Example 9 | ○ | x | ○ | ○ |
| Comparative Example 10 | ○ | x | ○ | x |
| Comparative Example 11 | ○ | x | ○ | x |

Compared to the coating layer films manufactured in Examples 1 to 3, in Comparative Examples 4 to 11, the coating layer films exhibited insufficient transmittance, haze, elongation at break, and self-healing ability. Alternatively, yellowing was observed, or the marker pen stains were not removed and were still left.

Example 4

A polyester thermoplastic polyurethane film (PP277 manufactured by DingZing) having a thickness of 150 μm was manufactured as a base layer film. The base layer had a haze of 2% and a transmittance of 92%. The first and second compositions were mixed in the same manner as in Example 1. Next, a coating solution was subjected to casting so that a coating layer film having a thickness of 15 μm was positioned on the base layer, and the coating layer was then formed through drying and aging processes. An acrylate pressure-sensitive adhesive layer having a thickness of 35 μm was formed on a release film, and the base layer film was laminated on the adhesive layer to manufacture a paint protection film in which the coating layer, the base layer, and the adhesive layer were sequentially laminated. The transmittance and haze of the paint protection film, examined in the same manner as in Example 1, were 92% and 2%, respectively.

Example 5

The paint protection film was manufactured in the same manner as in Example 4, except that the coating layer had a thickness of 25 μm. The transmittance and haze of the paint protection film, examined in the same manner as in Example 1, were 91% and 2%, respectively.

Comparative Example 12

The paint protection film was manufactured in the same manner as in Example 4, except that the coating layer had a thickness of 40 μm. The transmittance and haze of the paint protection film, examined in the same manner as in Example 1, were 84% and 3%, respectively.

Example 5

The paint protection film was manufactured in the same manner as in Example 4, except that 110 g of modified silicone oil (having a specific gravity of 0.97 and a refractive index of 1.407 (according to ASTM D1218), at a temperature of 25° C.), in which a carbinol group was introduced into one end, was added to the first composition prepared in Example 1. The transmittance and haze of the paint protection film, examined in the same manner as in Example 1, were 92% and 2%, respectively. In addition, a droplet contact angle, measured using a contact angle meter, was 107°.

Comparative Example 13

The paint protection film was manufactured in the same manner as in Example 4, except that 110 g of modified silicone oil (having a specific gravity of 0.97 and a refractive index of 1.407 (according to ASTM D1218), at a temperature of 25° C.), in which a carbinol group was introduced into one end, was added to the second composition prepared in Example 1. The transmittance and haze of the paint protection film, examined in the same manner as in Example 1, were 90% and 4%, respectively. In addition, a droplet contact angle, measured using a contact angle meter, was 98°.

What is claimed is:

1. A paint protection film comprising:
   a coating layer comprising a polycaprolactone-based polyurethane formed of a coating solution in which first and second compositions are mixed;
   a base layer comprising a polyester-based thermoplastic polyurethane; and
   an adhesive layer,
   wherein the first composition has a viscosity in a range of 1 cPs to 10 cPs at a temperature of 25° C. and comprises: 75 parts to 185 parts by weight of an ester-based solvent, 10 parts to 80 parts by weight of a ketone-based solvent, and 60 parts to 160 parts by weight of a glycol ester-based solvent, with respect to 100 parts by weight of a polycaprolactone triol,
   the second composition has a viscosity in a range of 40 cPs to 50 cPs at a temperature of 25° C. and comprises: 10 parts to 35 parts by weight of an aromatic hydrocarbon-based solvent and 10 parts to 35 parts by weight of an ester-based solvent, with respect to 100 parts by weight of hexamethylene diisocyanate,
   the first composition comprises a non-volatile phase in an amount in a range of 20% to 30% by weight,
   the second composition comprises a non-volatile phase in an amount in a range of 60% to 80% by weight, and
   a weight ratio of the first composition to the second composition is in a range of 2.5:1 to 3.5:1.

2. The film of claim 1, wherein the coating layer has an elongation at break of 160% or higher at a temperature of 25° C., a haze of 2% or lower, and a transmittance of 90% or higher.

3. The film of claim 1, wherein the ester-based solvent comprises at least one selected from the group consisting of ethyl acetate, n-butyl acetate, isobutyl acetate, and amyl acetate.

4. The film of claim 1, wherein the ketone-based solvent comprises at least one selected from the group consisting of acetone, acetylacetone, methyl ethyl ketone, methyl isobutyl ketone, diisobutyl ketone, and cyclohexanone.

5. The film of claim 1, wherein the glycol ester-based solvent comprises at least one selected from the group consisting of ethylene glycol methyl ether acetate, diethylene glycol monobutyl ether acetate, ethylene glycol monobutyl ether acetate, propylene glycol monoethyl ether acetate, and propylene glycol methyl ether acetate.

6. The film of claim 1, wherein the aromatic hydrocarbon-based solvent comprises at least one selected from the group consisting of xylene, toluene, and benzene.

7. The film of claim 1, wherein the first composition comprises a carbinol-substituted modified silicone oil in an amount in a range of 3 parts to 20 parts by weight with respect to 100 parts by weight of the polycaprolactone triol, and
   the modified silicon oil has a specific gravity in a range of 0.96 to 0.98 and a refractive index in a range of 1.405 to 1.410, at a temperature of 25° C.

8. The film of claim 1, wherein the base layer comprises an ultraviolet (UV) stabilizer.

9. The film of claim 1, wherein the adhesive layer comprises a polyacrylate pressure-sensitive adhesive.

* * * * *